United States Patent [19]

Nagashima

[11] Patent Number: 5,019,919
[45] Date of Patent: May 28, 1991

[54] APPARATUS FOR RECORDING AND REPRODUCING DIVIDED SIGNALS OF AN ANGLE MODULATED SIGNAL

[75] Inventor: Yoshitake Nagashima, Kanagawa, Japan

[73] Assignee: Canon Kabushiki Kaisha, Tokyo, Japan

[21] Appl. No.: 34,212

[22] Filed: Apr. 3, 1987

[30] Foreign Application Priority Data

Apr. 9, 1986 [JP] Japan .................................. 61-082932
Apr. 9, 1986 [JP] Japan .................................. 61-081540

[51] Int. Cl.⁵ .................................................. G11B 20/06
[52] U.S. Cl. ........................................ 360/22; 360/26; 369/59
[58] Field of Search ............... 358/310, 327, 330, 335, 358/337; 360/22–24, 26, 32, 33.1, 36.1, 36.2, 39; 369/59

[56] References Cited

U.S. PATENT DOCUMENTS

| 3,513,266 | 5/1970 | Frost et al. .......................... 360/23 |
| 3,553,080 | 1/1971 | Hammond ............................ 360/22 |
| 3,562,723 | 2/1971 | Behr et al. ............................ 360/26 |
| 3,685,021 | 8/1972 | Mauch et al. ........................ 360/22 |
| 3,746,781 | 1/1973 | Nakayama ............................ 360/26 |
| 4,458,271 | 7/1984 | Horstmann ....................... 360/22 X |
| 4,485,395 | 11/1984 | Warren ............................. 360/22 X |
| 4,513,328 | 4/1985 | Heitmann ......................... 360/22 X |
| 4,668,985 | 5/1987 | Kurashige et al. ............... 360/22 X |
| 4,764,820 | 8/1988 | Takeshita ............................. 360/22 |

FOREIGN PATENT DOCUMENTS 61-27946 6/1986 Japan .

Primary Examiner—Roy N. Envall, Jr.
Assistant Examiner—W. R. Young
Attorney, Agent, or Firm—Robin, Blecker, Daley & Driscoll

[57] ABSTRACT

A recording and/or reproducing apparatus is arranged to simultaneously record on a recording medium a plurality of divided signals which are inverted at different timing points from each other according to the inverting timing of an angle modulated information signal; to reproduce the plurality of divided signal simultaneously from the recording medium; to obtain a restored signal which is inverted according to every inverting timing of the plurality of divided signals reproduced from the recording medium; and to correct the time base of at least one of the plurality of reproduced divided signals on the basis of the restored signal.

3 Claims, 4 Drawing Sheets

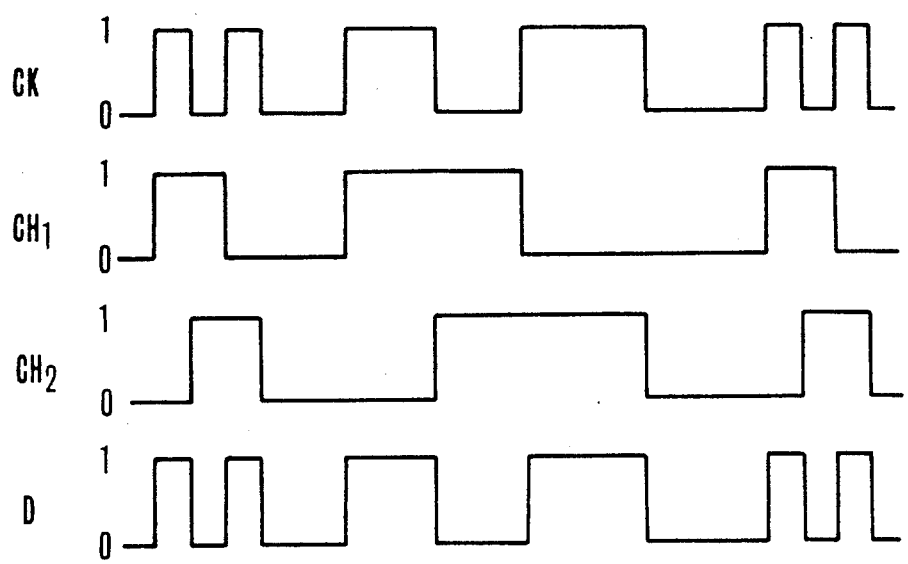

APPARATUS FOR RECORDING AND REPRODUCING DIVIDED SIGNALS OF AN ANGLE MODULATED SIGNAL

BACKGROUND OF THE INVENTION

1. Field of the Invention

This invention relates to an apparatus for recording and/or reproducing an angle modulated signal and more particularly to an apparatus for recording and/or reproducing a wide band, angle-modulated signal after converting the signal into narrower band signals by dividing the channel thereof.

2. Description of the Related Art

Various information signal transmission systems have heretofore been developed for transmission of signals having wide bands. In the case of, for example, a video tape recorder arranged to record a signal of such a wide band as about 20 MHz as that of the luminance signal of a high quality television signal, it is very difficult to record the signal without compressing the band thereof. For recording a signal of such a high frequency, various losses such as a space loss and a gap loss greatly increase even if a relative speed between a magnetic head and a magnetic recording medium such as a magnetic tape is increased as much as possible. Besides, there are no known materials for the magnetic head that is capable of adequately operating at such a high frequency zone.

To solve this problem, it has been proposed to record or reproduce a high quality television signal of such a wide band by dividing it into narrow band signals of a plurality of channels and to have these narrow band signals recorded or reproduced respectively.

However, the above stated band compressing method inevitably somewhat degrades the picture quality of the original signal. Hence, the effective compressible extent of the band is limited. Further, the method of recording the original signal by dividing it into a plurality of channels necessitates use of, for example, a plurality of memories and a digital signal processing arrangement for channel dividing by writing or reading the signal into or from these memories under the control of a control circuit. The conventional method thus has resulted in a complex and expensive arrangement.

Meanwhile, another multi-channel method has been proposed. According to this method, a wide band information signal is frequency modulated; the timing of the rises and falls of the modulated signal are detected; timing signals thus obtained are frequency divided at different phases to obtain signals of a plurality of channels; and then these signals are simultaneously transmitted or recorded. The details of this method are as disclosed in U.S. Pat. No. 3,513,266 and Japanese Patent publication No. SHO 61-27946. This method makes a wide band information signal obtainable in a multiple channel with a relatively simple circuit arrangement.

However, with a wide band information signal recorded or reproduced by this method, it is impossible to obtain an adequately restored signal when any shift arises on the time base between a plurality of channels of reproduced signals due to the limited positional precision of recording/reproducing heads which varies between one apparatus and another. Therefore, this method necessitates a circuit for correcting the time base during a reproducing operation.

SUMMARY OF THE INVENTION

This invention is made on the above stated background. It is a general object of the invention to further simplify the prior art circuit arrangement.

It is a more specific object of this invention to simplify a circuit arrangement of an apparatus wherein a plurality of divided signals which are inverted at different timings according to the inverting timing of an angle modulated information signal.

Under this object, an angle modulated signal recording apparatus which is arranged as an embodiment of this invention comprises: input means for receiving an angle modulated signal; converting means for converting the angle modulated signal into a rectangular waveform signal; dividing means for producing a plurality of divided signals which are inverted at different timing points according to the timing of the edges of the rectangular waveform signal, the dividing means including a plurality of registers which are connected in series and arranged to be operated by the edges of the rectangular waveform signals and taking-out means for taking out the outputs of the plurality of registers as the divided signals; and recording means for simultaneously recording the plurality of divided signals on one and the same recording medium.

It is another specific object of this invention to simplify a circuit arrangement for reproducing a plurality of divided signals which are arranged to be inverted at different timing points from each other.

Under this object, a reproducing apparatus which is arranged as another embodiment of this invention to reproduce an angle modulated, rectangular waveform information signal from a single recording medium on which a plurality of divided signals which are inverted at different timing points from each other according to the timing of the edges of the information signal comprises: reproducing means which is arranged to simultaneously reproduce the plurality of divided signals; restored signal forming means for forming a restored signal which is inverted according to every inverting timing of the plurality of signals reproduced by the reproducing means; output means for producing the information signal which is obtained by demodulating the restored signal; delay means for delaying at least one of the plurality of divided signals which are reproduced by the reproducing means; and control means for controlling the delay means on the basis of the restored signal.

The above and further objects and features of this invention will become apparent from the following detailed description of embodiments thereof taken in connection with the accompanying drawings.

BRIEF DESCRIPTION OF THE DRAWINGS

FIG. 2 is a timing chart showing the operation of the various parts of the embodiment shown in FIG. 1.

FIG. 3 shows an arrangement for reading data of a memory table shown in FIG. 1.

DETAILED DESCRIPTION OF THE PREFERRED EMBODIMENTS

Figure 1:
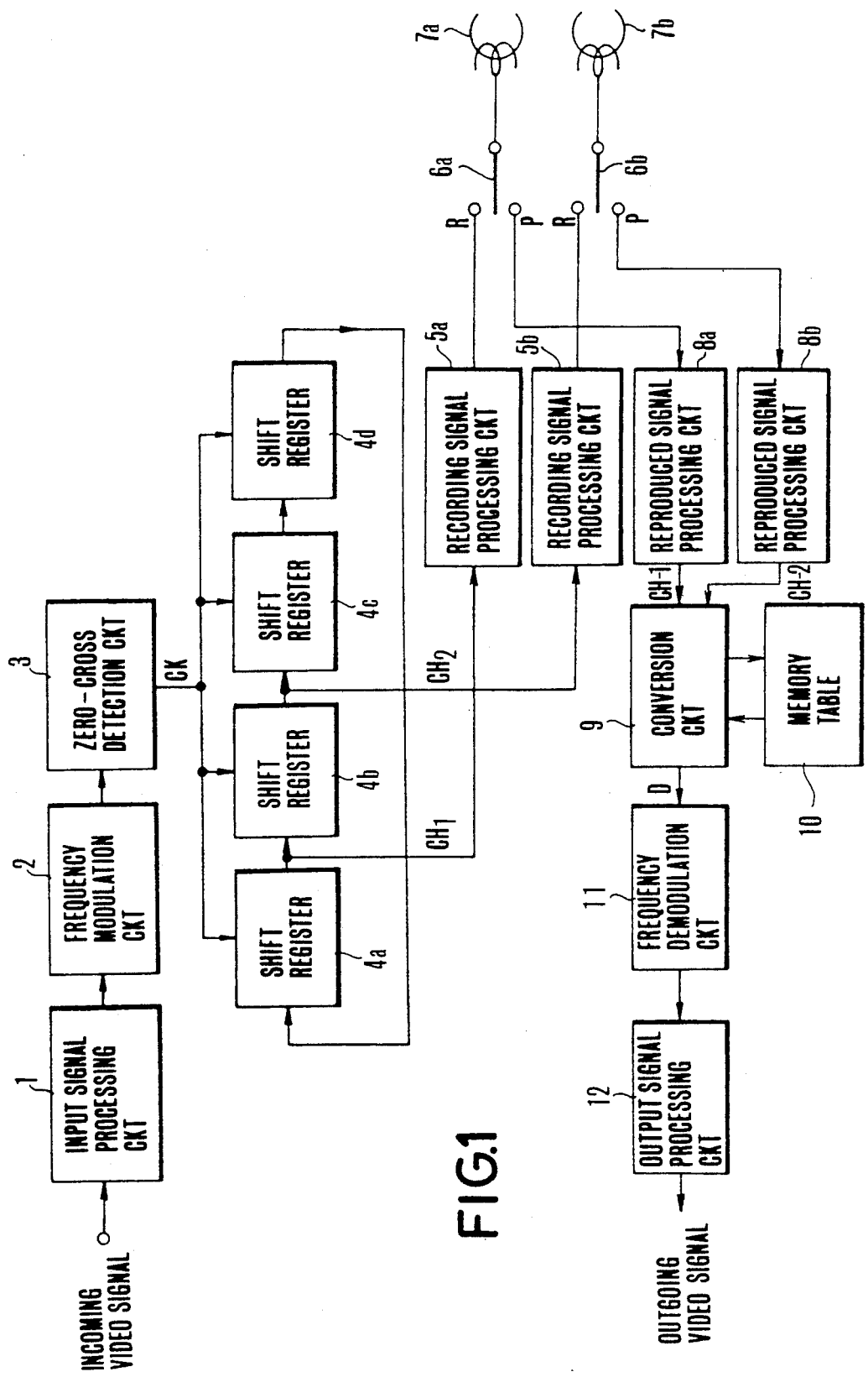
FIG. 1 is a block diagram showing in outline the arrangement of a video tape recorder embodying this invention.

FIG. 1 shows in outline a video tape recorder arranged as an embodiment of this invention. For the sake of simplification of the illustration, FIG. 1 shows the embodiment as arranged to record and reproduce by dividing an incoming signal into two. The incoming video signal which is of a wide band is received at an input signal processing circuit 1. The circuit 1 performs a pretreatment on the incoming signal for recording including amplification, correction and conversion into a signal form suited for recording as necessary. The treated signal is then frequency modulated at a frequency modulation circuit 2. The signal modulated by the circuit 2 is compared at a zero-cross detection circuit 3 with a zero level value arranged as a reference value. The circuit 3 then generates a clock signal CK the state of which is inverted between "0" and "1", i.e. from "0" to "1" and vice versa, when the level of the modulated signal crosses the zero level. This clock signal CK is arranged to be supplied to the clock input terminals of shift registers 4a to 4d.

As shown in FIG. 1, the shift registers 4a to 4d form a ring counter of four bits. The shift registers 4a and 4b are initially set at "0" and the shift registers 4c and 4d at "1". The output of the shift register 4d is arranged to be supplied to the shift register 4a. In this embodiment, the shift registers 4a to 4d are arranged to be triggered by the edges of the signal coming to their clock input terminals respectively.

FIG. 2 is a chart showing the timing of the operation of the various parts of FIG. 1. When the clock signal CK which is as shown in FIG. 2 is supplied as an operation clock signal to the shift registers 4a to 4d, each of the shift registers 4a to 4d detects an edge part of the clock signal CK and produces a binary signal received at its input side and supplies it to the next shift register. Assuming that the output of the shift register 4a is CH1 and that of the shift register 4b CH2, the wave forms of the outputs CH1 and CH2 are as shown at parts CH1 and CH2 in FIG. 2.

In other words, the incoming video signal which is frequency modulated carries information in each time interval between its zero crossing points. In the case of this embodiment, the clock signal is generated in such a way as to have its state inverted at every zero crossing point. The ring counter consisting of the shift registers is thus arranged to be actuated by the timing of the rising and falling edges of the clock signal. Assuming that the initial output data of the registers 4a, 4b, 4c and 4d of the ring counter are "0", "0", "1" and "1" the information can be divided into two as shown in FIG. 2. Compared with the clock signal CK which corresponds to the frequency modulated signal obtained from the incoming video signal, the two output signals CH1 and CH2 which are obtained from the shift registers 4a to 4d have lower frequencies and thus have narrower bands.

The signals CH1 and CH2 which are obtained by narrowing the band of the incoming video signal are supplied to recording signal processing circuits 5a and 5b. Then, the circuits 5a and 5b perform signal processing operations on these signals CH1 and CH2 including addition of signals which are arranged to permit discrimination of channels, amplification, etc. as necessary for recording. After that, they are supplied to the connecting sides R of switches 6a and 6b as shown in FIG. 1.

During a recording operation, the connecting positions of these switches 6a and 6b are on their sides R. The signals CH1 and CH2 supplied to the switches 6a and 6b are then simultaneously recorded by magnetic heads 7a and 7b via these switches 6a and 6b on a magnetic tape which is not shown. The magnetic heads 7a and 7b are, for example, arranged to have different azimuth angles from each other and to record the signals CH1 and CH2 on the magnetic tape in the form of recording tracks which have different magnetizing directions from each other. Magnetic recording of course can be accomplished in a high degree of density by forming these tracks close to each other.

In reproducing the magnetic record from the magnetic tape, channel discrimination signals which are added during the recording operation enable the signal CH1 to be reproduced by the magnetic head 7a and the other signal CH2 to be reproduced by the other head 7b. The reproduced signals CH1 and CH2 are supplied to a reproduced signal processing circuits 8a and 8b via the switches 6a and 6b which have their connecting positions on the sides P thereof during a reproducing operation.

The reproduced signal processing circuits 8a and 8b are arranged to perform reproduced signal processing operations on the reproduced signals CH1 and CH2 including a process of removing the channel discrimination signals from these signals CH1 and CH2, a process of removing such fluctuating components as jitters, etc., an amplifying process, a correcting process, etc. After the processing operation, the circuits 8a and 8b produce signals CH-1 and CH-2, which correspond to the signals CH1 and CH2.

The signals CH-1 and CH-2 which have undergone the reproduced signal processing operation are then supplied to a conversion circuit 9. The conversion circuit 9 is arranged to restore the original clock signal CK from the signals CH-1 and CH-2. The circuit 9 detects the high (H) or low (L) logical level of the input signal and reads out, according to the combination of these H and L levels, data stored in a memory table 10 the contents of which are as shown in FIG. 3. Then, a restored signal D is produced from the conversion circuit 9 according to the table which is as represented by FIG. 3. Further, a group of signal restoring circuits including the conversion circuit 9 and the memory table 10 may be formed, for example, by a logical circuit arrangement including an exclusive OR circuit, etc. in cases where the signal is to be divided into a small number of parts.

The restored signal D which is generated in the manner as described above has the same wave form as the clock signal CK as shown in FIG. 2. The restored signal is demodulated by the frequency demodulation circuit 11. The demodulated signal is then converted back into the same signal form as its original form by an output signal processing circuit 12 before it is produced as an output video signal.

As described in the foregoing, the video tape recorder which embodies this invention is arranged to record a wide-band video signal by dividing it into two narrow-band signals. However, the signal dividing number may be changed as desired by arranging a 2n number of shift registers to form a ring counter of 2n bits; by arranging the initial data of a series connected n number of registers to be "1" and that of the other n number of registers to be "0"; and by supplying the conversion circuit 9 with an n kind of outputs. With the dividing number thus increased, the arrangement permits recording of a signal of a still wider band or permits recording of the same signal by dividing it into signals of a further narrowed band and by using an n number of magnetic heads.

In this embodiment, the invented dividing process is carried out after frequency modulation. However, in accordance with the invention, the signal may be modulated by some other method of angle modulation such as phase modulation. Further, the signal to be divided does not have to be a binary signal but may be any other signal as long as the state thereof is variable according to the clock signal CK. In the case of frequency modulation, the S/N ratio can be improved by increasing the degree of frequency modulation.

Further, in the case of the embodiment described, this invention is applied to a video tape recorder which is arranged to record a wide-band signal into narrow-band signals. However, the invention is not limited to such applications but is also applicable to a communication apparatuses, wire transmission apparatuses, etc. to enable them to transmit a wide-band signal through narrow-band transmission lines.

Figure 4:
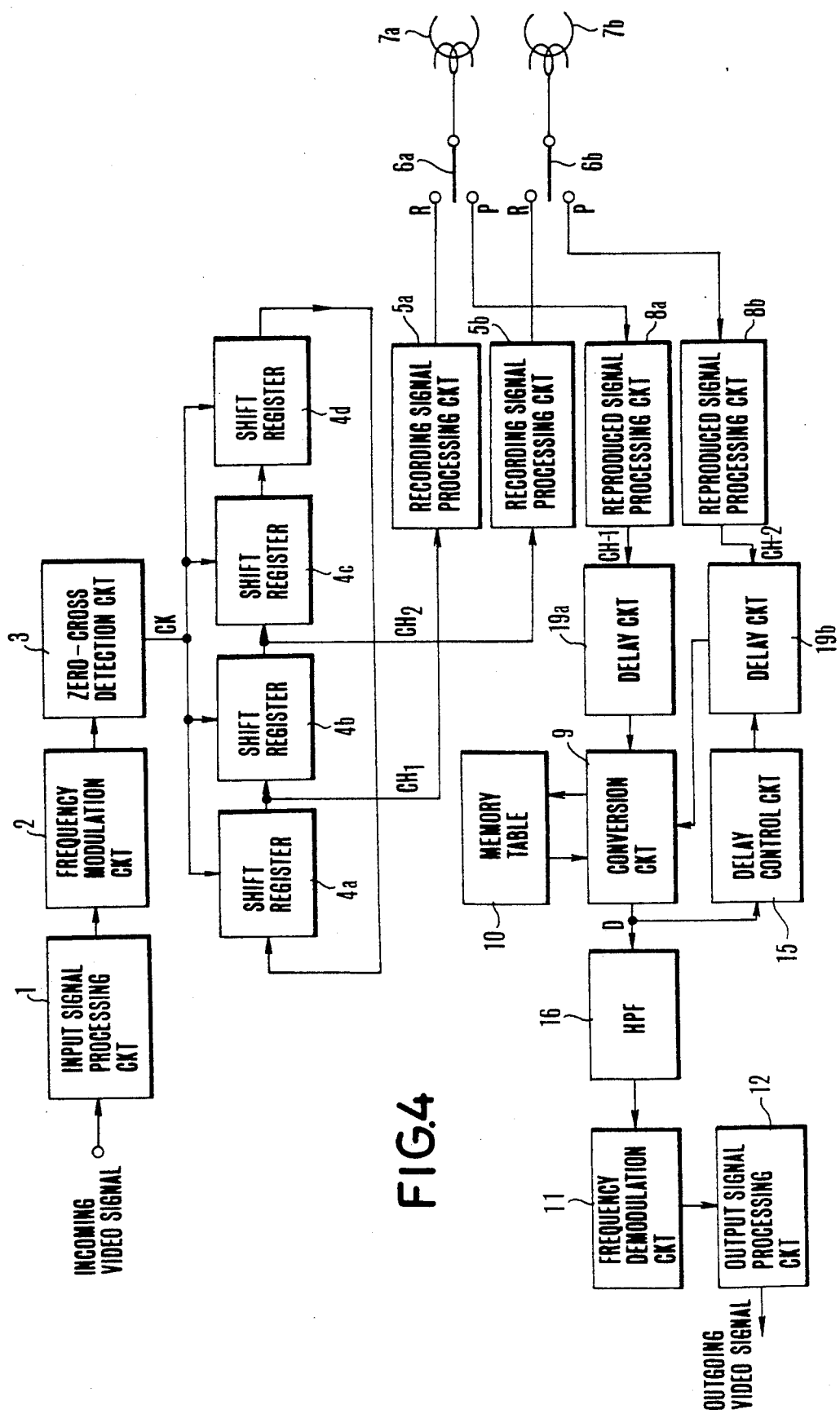
FIG. 4 is a block diagram showing in outline the arrangement of a video tape recorder arranged as another embodiment of this invention.

FIG. 4 shows a video tape recorder which is arranged according to this invention as another embodiment thereof. The same components and parts as those shown in FIG. 1 are indicated by the same reference numerals and details of them are omitted from the following description. Further, the recording system is arranged in the same manner as in the embodiment shown in FIG. 1.

Reproduced signals CH1 and CH2 are supplied to reproduced signal processing circuits 8a and 8b to be subjected to a reproduced signal processing operation which is performed in the same manner as in the preceding embodiment including removal of the channel discrimination signals, amplification and various signal correcting actions. Through this processing operation, signals CH-1 and CH-2 are obtained respectively from the signals CH1 and CH2 as indicated by full lines in FIG. 5.

The treated reproduced signals CH-1 and CH-2 are supplied to delay circuits 19a and 19b. The delay circuit 19a is arranged to delay the signal, for example, a predetermined period of time t0. The other delay circuit 9b is arranged to have a variable delay time t0±Δt. The signals CH-1 and CH-2 which are thus delayed by the delay circuits 19a and 19b are supplied to a conversion circuit 9. The circuit 9 then produces a restored signal D in the same manner as in the case of the preceding embodiment. The restored signal D which is produced from the conversion circuit 9 is supplied to a high-pass filter (HPF) 16 and also to a delay control circuit 15. The delay control circuit 15 separates the DC component of the restored signal D and controls the delay time of the delay circuit 19b according to the level of this DC component, because: Since the restored signal D and the original signal thereof are frequency modulated, if the original signal is restored with perfect fidelity, no DC component would be generated. However, unevenness in the mounting positions, aging deterioration, etc. of reproducing magnetic heads 7a and 7b cause some absolute time deviation of the signals CH-1 and CH-2 as represented by a difference between a full line part and a broken line part of FIG. 5. Accordingly, there arises a relative time deviation between the reproduced signals of the two channels. As a result, some DC component is generated within the restored signal D. A positive DC component is generated when the signal CH-2 delays relative to the signal CH-1. A negative DC component is generated if the signal CH-2 comes ahead of the signal CH-1. Then, a reproduction processing operation such as demodulation, etc. performed as will be described later on the restored signal D which includes such a DC component gives a reproduced video signal in a deteriorated state as compared with the incoming video signal.

To solve this problem, this embodiment is arranged as mentioned above to detect the DC component in question by means of the delay control circuit 15; and to have the signal CH-2 generated in its normal position by controlling the delay time of the delay circuit 19b according to the level of the DC component detected. The delay time is controllable, for example, by arranging the delay circuit 19b to be composed of an LC circuit and to have its value of C variable with a variable capacitor or the like. Further, the delay circuit 19a is arranged in the same manner as the delay circuit 19b except that the value of C is fixed. The delay circuits 19a and 19b do not have to be LC circuits. They may be arranged, for example, with delay lines of CCD or memories and to have the delay time controllable by adjusting the timing of reading.

The restored signal D which is produced from the conversion circuit 9 is thus under the servo-control of the delay circuits 19a, 19b and the delay control circuit 15 to make its DC component zero. The signal D is therefore supplied to the HPF 16 in a stable state free from any DC component.

Figure 5:
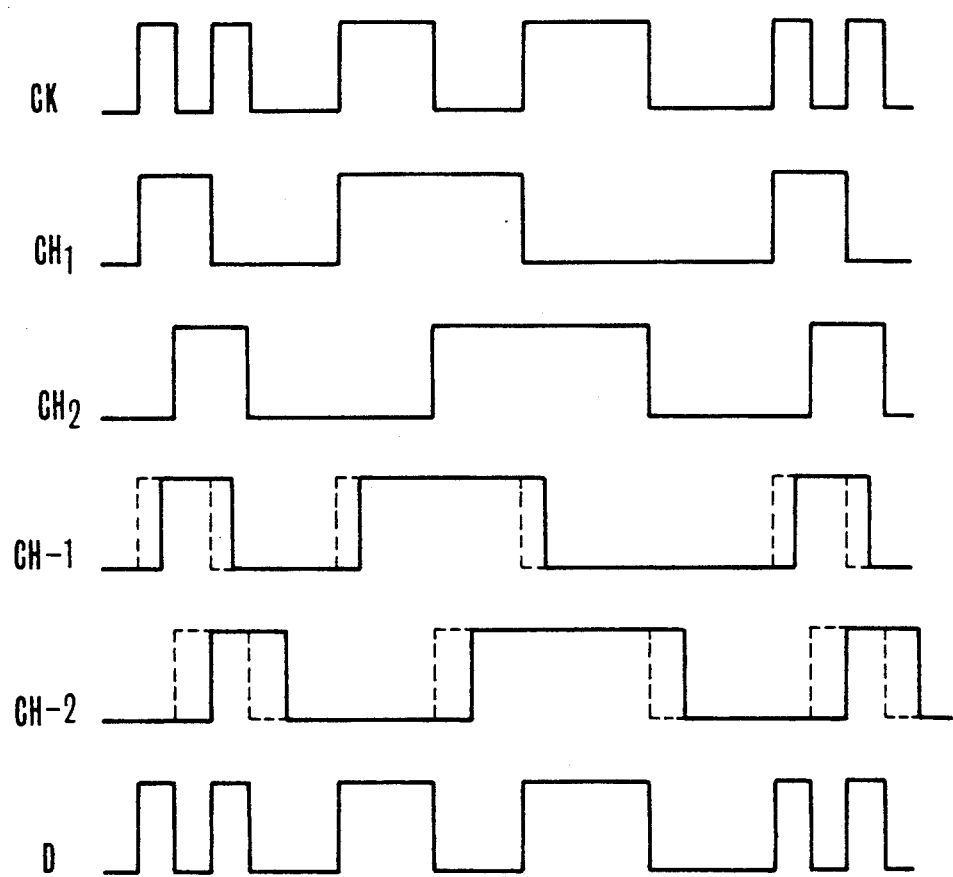
FIG. 5 is a timing chart showing the operation of the various parts of FIG. 4.

After its low frequency component is removed by the HPF 16, the restored signal D comes to have the same wave form as the clock signal CK as shown in FIG. 5. The signal D is then demodulated by the frequency demodulation circuit 11. The output of the circuit 11 is converted by the output signal processing circuit 12 into the same signal form as that of the incoming signal before it is produced as an output video signal.

What is claimed is:

1. An angle modulated signal recording apparatus comprising:
    (a) input means for receiving an angle modulated signal;
    (b) converting means for converting said angle modulated signal into a rectangular waveform signal;
    (c) dividing means for producing a plurality of divided signals by inverting at different timing points according to rectangular waveform signal timing edges, said dividing means including a plurality of registers which are connected in series and operated by the edges of said rectangular waveform signal and taking-out means for taking outputs of said plurality of registers as said divided signals; and
    (d) recording means for simultaneously recording said plurality of divided signals on one and the same recording medium.

2. An apparatus according to claim 1, wherein said dividing means includes a 2n number of said registers and an n number of said taking-out means.

3. An apparatus according to claim 2, wherein the initial data of said 2n number of registers are arranged to be "1", "1", "0" and "0" in the order of connection.

* * * * *